Dec. 9, 1958     F. J. P. SCHLOEMER     2,863,388
MARKING MEASURING INSTRUMENT
Filed June 7, 1957                    2 Sheets-Sheet 1

INVENTOR.
FRANK J. P. SCHLOEMER,
BY
McMorrow, Berman + Davidson
ATTORNEYS.

Dec. 9, 1958  F. J. P. SCHLOEMER  2,863,388
MARKING MEASURING INSTRUMENT
Filed June 7, 1957  2 Sheets-Sheet 2
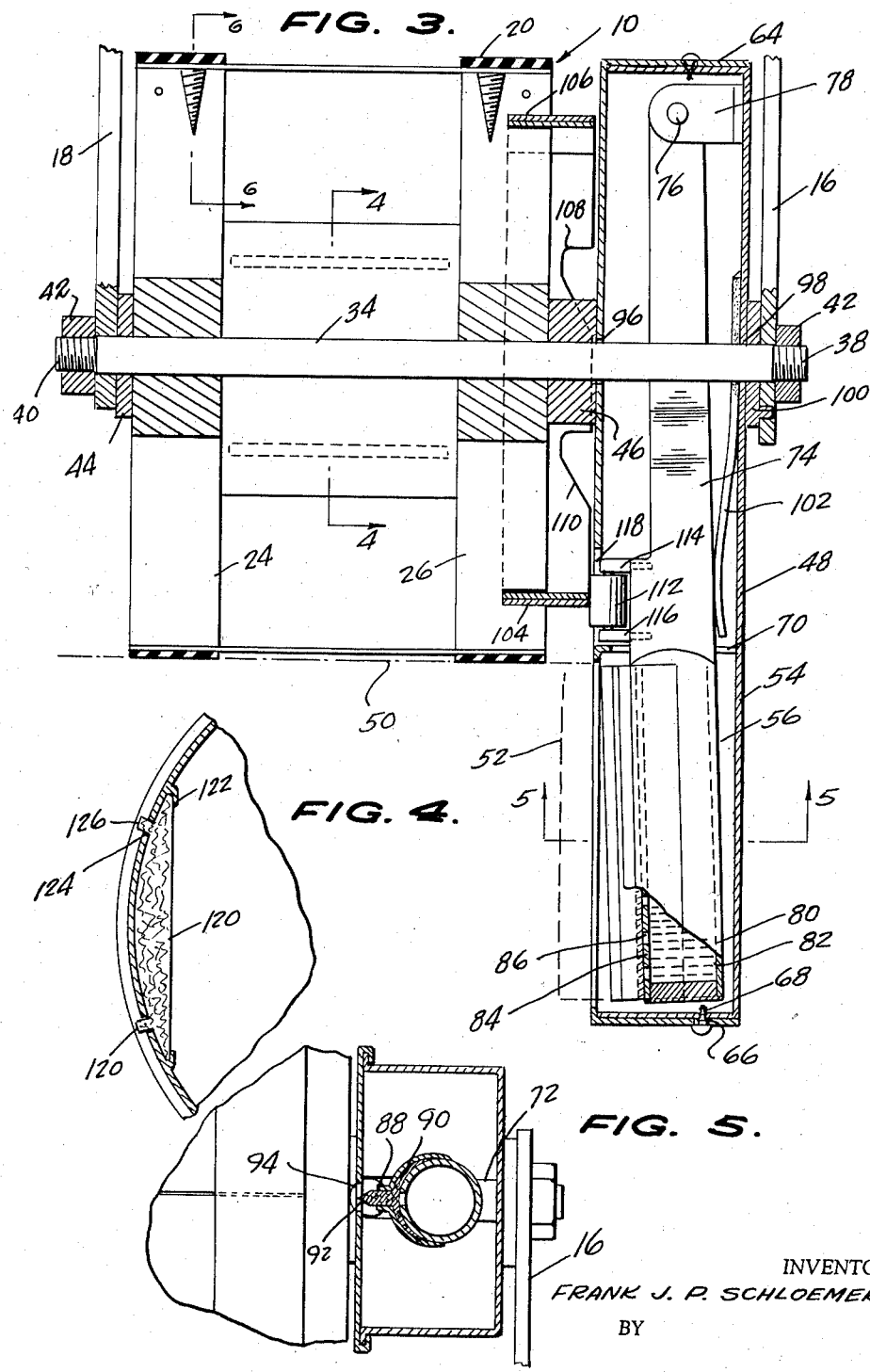
INVENTOR.
FRANK J. P. SCHLOEMER,
BY
McMorrow, Berman & Davidson
ATTORNEYS.

United States Patent Office 2,863,388
Patented Dec. 9, 1958

2,863,388

MARKING MEASURING INSTRUMENT

Frank J. P. Schloemer, San Bernardino, Calif.

Application June 7, 1957, Serial No. 664,437

5 Claims. (Cl. 101—327)

This invention appertains to improvements in measuring devices and particularly relates to a novel combined measuring and marking instrument, which is adaptable for various uses where substantially accurate marked measurements are desired.

A primary object of the present invention is to provide a mobile device, which may be easily moved over a surface to automatically mark certain points along the surface in an accurate measured manner.

Another important object of the present invention is to provide an instrument which can be used to mark certain points along a given line or path in accordance with the movements of the device over the line or path.

A further important object of the present invention is to provide a marking and measuring instrument of the roller-type which can be used to designate, by suitable markings, on a surface the linear travel of the device at a pre-determined relationship between the revolutions of the device and the linear extent of the surface.

A further important object of the present invention is to provide a combined marking and measuring wheel unit, which can be easily moved by an operator over a surface, while the operator walks erect, for the purpose of marking the surface at spaced points, such spacing being determined by the peripheral dimensions of the device in accordance with the given purpose for which it is being used.

Another important object of the present invention is to provide a combined marking and measuring wheel-type instrument, which will automatically form vertical and horizontal markings, such markings being synchronized.

The foregoing and ancillary objects are attained by this invention, the preferred embodiment of which is set forth in the following description and illustrated in the accompanying drawings, wherein:

Figure 3 is a vertical sectional view thereof taken on the line 3—3 of Figure 2;

Figure 4 is a vertical sectional view taken on line 4—4 of Figure 3;

Figure 5 is a horizontal cross sectional view taken on line 5—5 of Figure 3;

Figure 1:
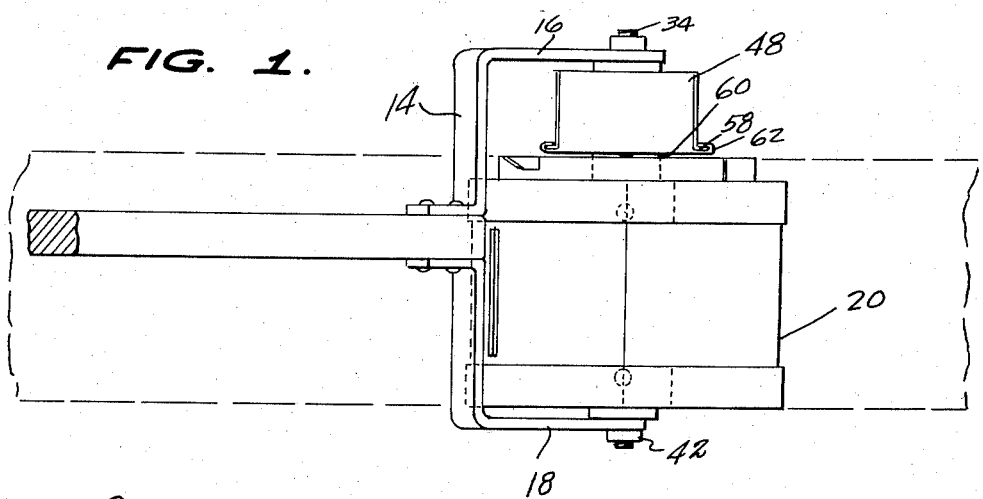
Figure 1 is a top plan view of the combined marking and measuring instrument of this invention.

The primary aim and purpose of the present invention is to provide a combined marking and measuring device of the wheel or roller type, which may be manually moved over a line or path by an operator, who can move the device from an erect, walking position and can easily maneuver it in accordance with a given line or path, without giving undue attention thereto.

The particular environment, though not exclusive environment, for the present invention, is in the building art. Conventionally, when a building is being laid out, that is, when the sub-flooring is down, the plates are laid around the building and then the workmen mark the places where the studding is to be erected. It is conventional practice to use a steel tape and the tape is hooked at one end onto a plate and then a square is used and the marks are made for the studding every sixteen inches along the steel tape. Such conventional practice requires workmen to expend considerable time and effort in marking the position for the studing.

The present invention comprises a combined marking and measuring device, which can be used to mark the places for the studding and which requires the services of only one workman, who can easily and, without giving undue attention, perform the marking operation. The device is first positioned at the point where the initial studding is to be positioned and then the device is moved along the plates, and stamping means is provided that marks the positions for the additional studdings, as the device is moved, such marking means being automatic in operation, as the device is moved along the plates. The device is preferably constructed so that the marking is made on the top and along the sides, that is, horizontally and vertically, at each point where the studing is to be erected. The particular distance between the studings can be varied, such variance being taken into consideration by the diametrical size of the surface traversing wheel or roller, which constitutes the measuring element.

Referring now more particularly to the accompanying drawings, the combined measuring and marking instrument or device 10 includes a handle element 12, which is secured at its lower end to a yoke piece 14, the legs 16 and 18 of which are parallel and rotatably support a drum 20.

Figure 2:
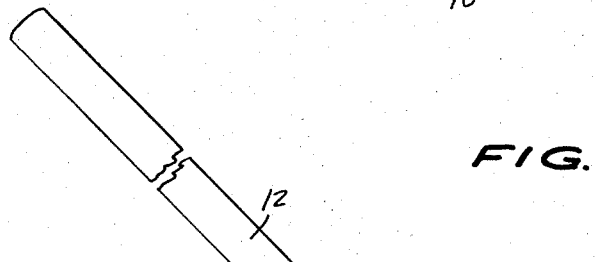
Figure 2 is a side elevational view thereof.
Figure 6:
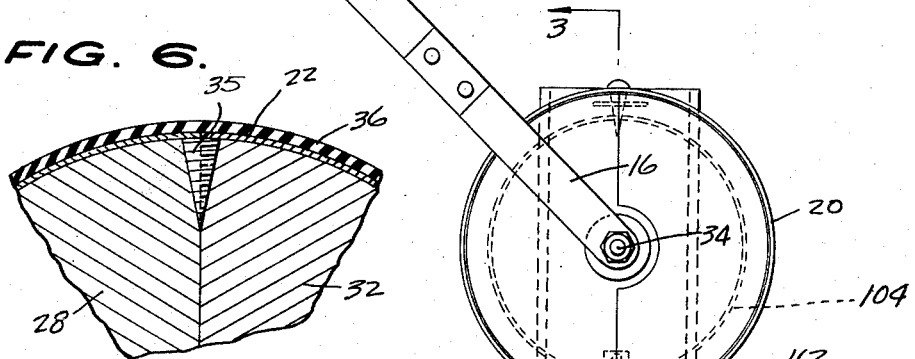
Figure 6 is a detailed vertical sectional view taken on line 6—6 of Figure 3.
Figure 7:
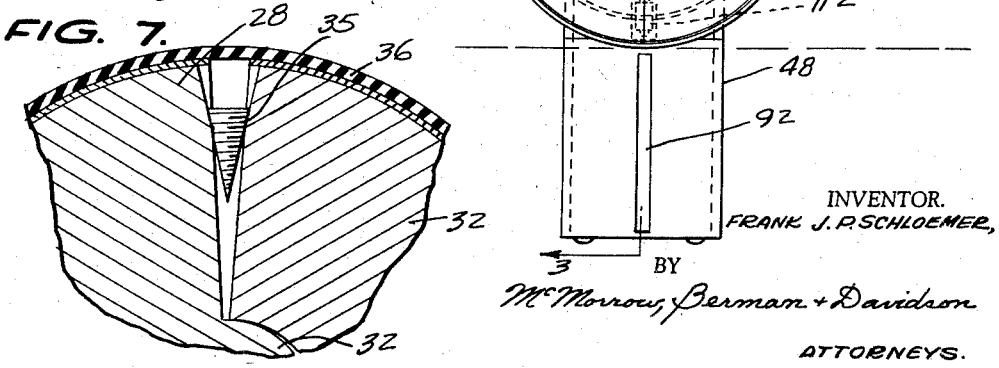
Figure 7 is a view similar to Figure 6 with the parts in a different relationship.

The drum 20, which constitutes the traversing element, is preferably made in the manner shown in Figures 3, 6, and 7. The drum 20 consists of a cylindrical split rim 22, which may be formed of any suitable and sturdy material, such as metal or plastic. The rim is positioned on spaced apart and parallel sides 24 and 26, which are made in sections, as shown in Figure 2. Each of the sides is similarly formed and each includes a section 28, which has a hub portion 30 and a section 32, which is complemental to the section 28. The hub section 30 is rotatably disposed on a transverse shaft 34, as shown in Figure 3. The sections are spread apart and held in joined relation by tapered screws 35, as shown in Figures 6 and 7. The hub is held on the sides 24 and 26 by resilient endless bands 36, as shown in Figures 3 and 6. The bands are disposed at the side edges of the hub and overlie the sides 24 and 26 and retain the hub in position on the sides, which are spread apart by the tapered screws 35.

The shaft 34 has opposing threaded ends 38 and 40, which receive nuts 42 that secure the ends of the legs or arms 16 and 18 of the yoke piece 14 on the shaft. Spacers 44 and 46 are circumposed on the shaft and space the sides 24 and 26 from the one nut 42 and from the housing 48, which will be described.

The resilient bands 36 fit over the rim 22 and constitute the peripheral surface of the drum 20, which is adapted to be rolled on a horizontal surface 50, which is adjacent to a vertical surface 52 and forms a right angle therewith, as shown in Figure 3.

The housing 48 is rectangular in shape and is formed in two pieces, such formation being preferable but not restrictive. The housing 48 includes a back wall 54, which is formed integral with spaced side walls 56, that terminate at their front edges in laterally directed flanges 58. A front wall 60 is provided with U-shaped side flanges 62 that fit over the flanges 58 and is also formed with laterally extending top and bottom flanges 64 and 66 that are secured to the top and bottom of the back wall 54 by screws 68. A transverse wall 70 is formed horizontally intermediate the top and bottom walls and is provided with a slot 72, which serves as a guideway for a vertically disposed arm 74. The arm 74 is pivoted by a pivot pin 76 to an ear 78 that projects forwardly from the rear wall 54 of the housing. The arm extends downwardly in the housing and terminates at its lower end in a chamber or reservoir 80 for a marking fluid 82, such as ink or the like. The front wall 84 of the chamber is provided with apertures 86 and a pad member 88 is fitted on the front wall of the chamber and held in place by an arcuate retaining member 90. The pad member 88 is semi-circular or arcuate in shape and is formed at its center with a pointed portion 92, that is adapted to extend through a vertical slot 94 in the front wall 60 of the housing. The front and rear walls of the housing are formed with aligned openings 96 and 98, whereby the housing is fitted on the shaft 34. A spacer 100 is positioned between the rear wall and the leg or arm 16 of the yoke 14, so that the spacers 46 and 100 dispose the housing for free movement on the shaft 34, the weight of the housing, which is disposed, adjacent its upper end on the shaft 34, maintaining the housing in a vertical position, as the drum 20 is rotated over the horizontal surface 50.

A leaf spring 102 is secured at its upper end to the rear wall 54 of the housing and bears at its lower, free end against the rear end of the arm 74, so as to urge the lower end of the arm forwardly of the housing and urge the marking or stamping portion 92 outwardly through the slot 94 in the front wall of the housing.

A cam track 104 is fixed in a suitable slot 106, formed in the outer surface of the side 26 and is disposed concentric to the shaft 34 and arranged concentrically within the rim 22. The outer edge of the track 104 extends beyond the side 26 and is formed with cam slots 108 and 110.

A roller 112 is vertically disposed at the front edge of the arm 74 and is mounted between projections 114 and 116, which extend forwardly from the front edge of the arm, the roller being freely rotatable between such projections. The roller is adapted to extend through an opening 118 in the front wall of the housing and bear against the outer edge of the track 104. The roller maintains the lower end of the arm inwardly of the housing in the position shown in Figure 3, so that the marking portion 92 is inwardly of the slot 94 in the front wall of the housing. The roller maintains the arm in such position against the urgement of the spring 102, as shown in Figure 3. When the roller rides within the slots 108 and 110, the spring 102 forces the lower end of the arm forwardly of the housing and urges the marking portion 92 outwardly through the slot 94, so as to bear against the vertical 52.

At such time, means is provided in the drum, so that the horizontal surface 50 is marked in accordance with the horizontally spaced, vertical markings, resulting from the arrangement of the slots 108 and 110.

Such horizontal markings are obtained by virtue of the inking pad 120, which is secured to the rim 22 at a point, arranged in relationship to the cam slots 108, 110, as shown in Figure 3. The inking pad 120 is secured to the inside of the rim by means of flanges 122 and the rim is formed with slots 124, through which marking portions 126 of the pad project.

It can thus be seen that as an operator, holding onto the handle 12, moves the drum over the surface 50, the drum freely rotating on the shaft 34, the track 104 will rotate with the drum. As the portions 126 of the pad 120 inscribe the spaced apart markings on the horizontal surface 50, the portion 92 will inscribe similar and related markings on the vertical surface 52, the arm 74 being swung outwardly by the spring 102, as the roller 112 drops into the slots 108 and 110 of the track 104.

The drum, by virtue of its two part construction, can be adjusted to the correct size and, in addition, by virtue of such construction, the pad 120 can be replaced.

It is to be particularly noted that the device of the present invention provides horizontal and vertical markings. The vertical markings are particularly provided for marking the floor joists or the ceiling joists.

Thus, it can be seen that a combined marking and measuring instrument is provided, which will provide markings on a horizontal and vertical surface, such markings being inscribed in a predetermined and measured arrangement.

While the preferred embodiment of this invention has been illustrated in the accompanying drawings and set forth herein, other forms may be realized as come within the scope of the appended claims.

I claim:

1. A marking measuring device comprising a cylinder, a shaft transversely extending through said cylinder and supporting it for free rotation on a surface, a frame connected to the shaft for moving the cylinder over the surface, a housing freely carried by and suspended from the shaft at one side of the cylinder and extending below the periphery of the cylinder, a marking element carried by the housing and extendable through the side of the housing facing the cylinder, spring means constantly urging the marking element through the side of the housing and means carried by the cylinder and the marking element for retaining the marking element within the housing except at certain intervals of the rotational movement of the cylinder.

2. A device as claimed in claim 1, wherein said last means includes a circular cam track carried by the side of the cylinder and a cam follower carried by the marking element and engaged with the cam track.

3. A device as claimed in claim 1, wherein said spring means includes a leaf spring carried by the shaft at one end and vertically disposed within the housing and bearing at its other end against the marking element.

4. A device as claimed in claim 1, wherein a marking means is mounted on the periphery of the cylinder in relation with said last named means so that the marking element and the marking means operate in synchronism.

5. A marking measuring device comprising a cylinder, means supporting the cylinder for free rotation on a surface, a frame carried by said means for moving the cylinder over the surface, a housing freely carried by and suspended from the means at one side of the cylinder and extending below the periphery of the cylinder, a marking element carried by the housing and extendible through the side of the housing facing the cylinder, and means constantly urging the marking element through the side of the housing and means carried by the cylinder and the marking element for retaining the marking element within the housing except at certain intervals of the rotational movement of the cylinder.

References Cited in the file of this patent

UNITED STATES PATENTS

| | | |
|---|---|---|
| 1,964,455 | Cook | June 26, 1934 |
| 2,451,595 | Wheeler | Oct. 19, 1948 |